US006760512B2

(12) United States Patent
Pepper

(10) Patent No.: US 6,760,512 B2
(45) Date of Patent: Jul. 6, 2004

(54) ELECTRO-OPTICAL PROGRAMMABLE TRUE-TIME DELAY GENERATOR

(75) Inventor: David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/877,976

(22) Filed: Jun. 8, 2001

(65) Prior Publication Data

US 2002/0186919 A1 Dec. 12, 2002

(51) Int. Cl.[7] .............................. G02B 6/26; G02B 6/42
(52) U.S. Cl. ........................... 385/27; 385/15; 385/39; 385/40; 385/48; 398/52; 398/53
(58) Field of Search .............................. 385/15, 27, 39, 385/40, 48, 24; 398/52, 53, 102; 359/140

(56) References Cited

U.S. PATENT DOCUMENTS

| | | | |
|---|---|---|---|
| 4,736,463 A | | 4/1988 | Chavez ........................ 455/606 |
| 4,813,766 A | * | 3/1989 | Keene et al. ................ 350/337 |
| 5,051,754 A | | 9/1991 | Newberg ..................... 342/375 |
| 5,061,048 A | * | 10/1991 | Hayden et al. .............. 359/315 |
| 5,103,495 A | * | 4/1992 | Goutzoulis ................... 385/15 |
| 5,117,239 A | | 5/1992 | Riza ............................. 342/375 |
| 5,202,776 A | | 4/1993 | Gesell et al. .................. 359/17 |
| 5,272,484 A | * | 12/1993 | Labaar ......................... 342/375 |
| 5,455,878 A | * | 10/1995 | Thaniyavarn ................. 385/16 |
| 5,461,687 A | * | 10/1995 | Brock ........................... 385/37 |
| 5,512,907 A | | 4/1996 | Riza ............................. 342/375 |
| 5,526,170 A | * | 6/1996 | Esman et al. ................ 356/318 |
| 5,543,805 A | * | 8/1996 | Thaniyavarn ................ 342/368 |

(List continued on next page.)

FOREIGN PATENT DOCUMENTS

WO 00/43828 7/2000 ........... G02F/1/035

OTHER PUBLICATIONS

Fu, Zhenhai and Chen, Ray T., "Five–bit substrate guided wave true–time delay module working up to 2.4 THz with a packing density of 2.5 lines/$cm^2$ for phased array antenna applications," *Optical Engineering*, vol. 37, No. 6, pp. 1838–1844 (1998).

Fu, Z., et al., "Five–bit substrate guided wave true–time delay module working up to 2.4 THz with a packing density of 2.5 lines/$cm^2$ for phased array antenna applicatons," *Opt. Eng.*, vol. 37, No. 6, pp 1838–1844 (Jun. 1998).

Tang, S., et al., "Polymer–based Optical Waveguide Circuits for Photonic Phased Array Antennas," *Proceedings of the SPIE (The International Society for Optical Engineering)*, vol. 3632, pp 250–261 (Jan. 1999).

Yamaguchi, M., et al., "Variable optical delay line based on a birefringent planar optical platform," *Optical Letters*, vol. 20, No. 6, pp 644–646 (Mar. 15, 1995).

Yin, S., "Lithium Niobate Fibers and Waveguides: Fabrications and Applications," *Proceedings of the IEEE*, vol. 87, No. 11, pp 1962–1974 (Nov. 1999).

*Primary Examiner*—Brian Healy
*Assistant Examiner*—Daniel Petkovsek
(74) *Attorney, Agent, or Firm*—Ladas & Parry

(57) ABSTRACT

A programmable electro-optically controlled optical delay device providing multiple optical outputs. The optical delay device provides multiple output ports where the optical propagation delay increases at each port. An incident optical beam is propagated within electro-optically active material within the device, so that the propagation delay at each output port may be varied according to an applied voltage. In an optical beam steering system, the present invention provides true-time delay for multiple optical beams, allowing the beams radiated by the beam steering system to be time-coincident. The present invention provides for one or two dimensional beam steering.

41 Claims, 4 Drawing Sheets

U.S. PATENT DOCUMENTS

| | | | | |
|---|---|---|---|---|
| 5,583,516 A | | 12/1996 | Lembo | 342/375 |
| 5,623,360 A | * | 4/1997 | Gesell et al. | 359/287 |
| 5,641,954 A | * | 6/1997 | Keefer et al. | 250/227.12 |
| 6,144,786 A | * | 11/2000 | Chethik | 385/24 |
| 6,157,475 A | * | 12/2000 | Dugan et al. | 359/110 |
| 6,310,831 B1 | * | 10/2001 | Dillman | 367/105 |
| 6,351,587 B1 | * | 2/2002 | Holland | 385/24 |
| 6,356,677 B1 | * | 3/2002 | Hall et al. | 385/15 |
| 6,393,177 B2 | * | 5/2002 | Paek | 385/24 |
| 6,674,930 B2 | * | 1/2004 | Hall et al. | 385/15 |
| 2002/0054726 A1 | * | 5/2002 | Fondeur et al. | 385/15 |
| 2002/0181874 A1 | * | 12/2002 | Tulchinsky et al. | 385/39 |
| 2003/0002773 A1 | * | 1/2003 | Parker | 385/15 |

* cited by examiner

ELECTRO-OPTICAL PROGRAMMABLE TRUE-TIME DELAY GENERATOR

FIELD OF THE INVENTION

The present invention relates to optical systems using pulsed optical signals. More specifically, the present invention relates to generation and delay of optical pulse streams.

BACKGROUND OF THE INVENTION

Optical beam control is often required where information from an optical beam must be relayed from one location to another. High-bandwidth, secure laser communication (e.g. pulse-burst encoding, pulse position modulation, etc.), infrared countermeasures (IRCM), target designation, bio/chem beam steering and laser radar are a few of the applications in which optical beam control is required. Optical beam control of pulsed optical beams requires that the control device provide time-coincident generation of the desired pulse format across the entire aperture of the control device.

Devices for steering optical beams are well known in the art. Optical beam steering can be implemented with electro-mechanical systems. Such systems generally consist of a mirror mounted on an electrical actuator. These systems provide relatively low losses for the strength of the reflected beam. However, such electro-mechanical systems are limited to low response frequencies up to the order of 1 KHz. The moving parts of an electro-mechanical system along with size and weight factors are considered to be major limitations of such a system.

Smaller and lighter optical beam steerers are provided by compact arrays of non-mechanical beam deflectors, such as optical MEMS mirrors (O-MEMS) or liquid crystal arrays. The optical signal provided to these devices is generally split into multiple optical signals. The arrays then actually consist of multiple optical radiators which act to steer and radiate multiple optical signals in a desired direction. However, since the radiators are generally deployed in a relatively flat plane, the output beams do not arrive at a receive point at the same time. This problem is particularly seen when the optical signal comprises pulsed signals. In this case, the optical pulse received from the radiating element furthest from the receive point will lag the pulse received from the closest radiating element. This problem is further exacerbated when the pulse widths (or the time slots for encoding) are shorter than the photon transit time across the radiating aperture. Performance of the optical transmitting system is improved when the individual optical beams are made time-coincident to create a time-coincident optical beam.

Applying a time delay to each optical beam before it is radiated provides the capability to generate a time-coincident optical beam. Controlling the delay of signals from individual transmitting elements is actually the principle behind a beamsteered phased array antenna system. Phased array antenna systems employ a plurality of individual antenna elements that are separately excited to cumulatively produce a transmitted electromagnetic wave that is highly directional. In a phased array, the relative phases of the signals provided to the individual elements of the array are controlled to produce an equiphase beam front in the desired pointing direction of the antenna beam. The premise of a true-time delay beamsteered phased array is to steer the array beam by introducing known time delays into the signals transmitted by the individual antenna elements. Accurate beam steering of a pulsed optical beam from individual optical elements similarly requires introducing time delays into the optical signals from individual optical elements to produce an equiphase optical beam front.

Optical control systems for producing selected time delays in signals for phased array antennas are well known in the art. Different types of optical architectures have been proposed to process optical signals to generate selected delays, such as routing the optical signals through optical fiber segments of different lengths; using deformable mirrors to physically change the distance light travels along a reflected path before transmission; and utilizing free space propagation based delay lines, which architecture typically incorporates polarizing beam splitters and prisms. These techniques can also be used for optical beam steering, with various levels of success.

The use of optical fiber segments to introduce delays requires the use of many optical switches and the splicing together of numerous segments of fiber. The costs of construction of such a device are substantial, given the significant amount of design work and precision assembly work required to produce a device having the range and incremental steps of time delays necessary to provide the desired steering. The numerous switching and coupling elements also introduce very high optical losses in the beamforming circuitry, requiring significant optical power.

The deformable mirror system relies on the physical displacement of a mirror to provide the necessary time delay; an array of moveable mirrors allows the generation of a range of delayed optical signals. This type of system introduces additional complexity into an optical beam steering system due to the tight tolerances and small time delays required for optical signals.

An optical architecture for time delay beamforming using free space elements is disclosed by Riza in U.S. Pat. No. 5,117,239, "Reversible Time Delay Beamforming Optical Architecture for Phased-Array Antenna," dated May 26, 1992. In Riza, input optical beams are directed through a plurality of free space delay devices which selectively delay the beams. The delay imparted to an individual beam is selected by a plurality of spatial light modulators coupled with polarizing beam splitters which will either pass a light beam or direct the light beam into a delay device. This architecture also requires a large number of individual delay devices, which increases the complexity and cost of the system.

An optical true-time delay bulk structure is disclosed by Zhenhai Fu and Ray T. Chen in "Five-bit substrate guided wave true-time delay module working up to 2.4 THz with a packing density of 2.5 lines/cm$^2$ for phased array antenna applications," Optical Engineering, Vol. 37, No. 6, June 1998, pp. 1838–1844. The bulk substrate disclosed by Fu and Chen comprises a passive waveguide that takes as an input an optical pulse and generates a sequence of output pulses with fixed delays. In this prior art, the passive substrate is used to provide delays to an optical signal and a photonic switching network is used to select a given set of taps. Holographic gratings are used to provide the output taps along the delay line. To assure that each tap has the same optical output power, the diffraction efficiency of the gratings is designed to increase along the delay line, as the successive taps couple the light out. Since the waveguide is passive, i.e., no external control is used to modify the delay provided by the waveguide, and, further, the tapped output locations are fixed, the output sequence of optical pulses is fixed in a temporal sense and cannot be changed. The device disclosed by Fu and Chen is directed to optically controlling an RF pulse-forming network with a fixed set of time delays.

Thus, it would be desirable to provide a mechanism for producing variable true time delay in an optical signal without requiring active switching and without high insertion loss. This mechanism would then allow for precision optical beam steering. In addition, it would be desirable to provide such a true time delay which is relatively simple, compact, and inexpensive.

SUMMARY OF THE INVENTION

It is therefore an object of the present invention to provide a device and method for providing true-time delayed optical signals without requiring active switching or incurring high insertion loss, such that the device and method can provide multiple delayed optical signals for input to an optical beam steering array.

It is a further object of the present invention to provide the desired delayed optical signals in a relatively simple, compact, and low cost manner.

Pursuant to the present invention, a method and apparatus is provided which produces several optical pulse streams with controllable time delays between the different pulse streams. The controllably-delayed optical pulse streams may be used to control a beam steering system so that the composite output beam exits the overall aperture of the beam steering system at the same time, regardless of the output angle. The beam steering system may be operated in a reciprocal fashion so that the beam steering system receives a composite optical beam at the same time, regardless of the input angle.

Multiple time delayed optical pulse streams are produced by coupling an optical pulse stream into a bulk or waveguide structure that contains multiple tapped output locations, similar to the structure disclosed by Fu and Chen. However, unlike the structure disclosed by Fu and Chen, the structure of the present invention comprises electro-optically active material for which the refractive index of the material changes depending upon the voltage applied across the material. As is known in the art, changing the refractive index of a material in which an optical signal is being transmitted results in changing the speed at which the signal is transmitted through the material, and thus provides for imparting a controllable delay to the signal.

A single controllable voltage may be uniformly applied across the structure or several separately controllable voltages may be applied at different locations across the structure. When a single voltage is applied to the structure, the delay between the output optical pulse streams from the output taps will change in proportion to the change in the applied voltage. If the structure is configured such that the delay between the pulse streams from each of the output taps is the same, a change in the applied voltage will change the delays between all of the pulse streams by the same temporal amount. If separately controlled voltages are applied at multiple locations across the structure, the delay of the pulse stream from each output tap or groups of optical taps can be separately controlled or changed as needed. Groups of output taps can be controlled so that pulse streams output by the structure are partitioned into smaller subsets of pulse streams. If a different voltage is applied at each output tap and the different voltages are varied on a pulse-by-pulse basis, each pulse in each pulse stream may have a unique temporal spacing relative to all of the other pulses output from the structure.

In a first embodiment, the present invention comprises a bulk or optical substrate delay line having a specified thickness. The delay line consists of a series of output ports, where the optical propagation delay at the output ports is electro-optically controllable. The output ports can be in the form of a series of independent gratings that diffract the incident optical beam at preferred locations along the waveguide. An optical pulse stream is coupled into the delay line at one end and reflects between internally reflective surfaces of the delay line. Since, the optical pulses travel from one surface to the other, the delay between the output ports is proportional to both the distance between the ports and the thickness of the delay line. The device can be viewed as a tapped delay line whose taps are all equally spaced in space (and, therefore, in time) along the waveguide. Preferably, the tap-to-tap temporal delays along the length of the waveguide are all the same, resulting in a series of parallel optical outputs with increasing delays. The tapped delays may all be controlled by a single voltage (via the electro-optic effect), applied across the device. Alternatively, the device can be electronically partitioned so that different subsets of taps can possess different, but, controllable, time delays. In this case, different control voltages are applied at different locations along the guide, resulting in subsets of the parallel outputs, each with its own delay sequence.

In a second embodiment, the present invention comprises a planar waveguide electro-optically active structure positioned within a cladding substrate. Transparent electrodes and gratings are contained in the cladding substrate. An incident optical beam is coupled into one end of the structure and propagates in a direction substantially parallel to the cladding substrate. The incident optical beam is diffracted out of the wave guide structure by the gratings to provide multiple delayed optical beams, where the delay between the beams is a factor of the spatial displacement of the gratings and of a voltage applied to the electrodes across the electro-optically active structure. The electrodes may be partitioned into several regions, providing the capability for separately controlling the delay applied to separate sets of beams.

An optical beam steering system with true-time delay characteristics is provided in accordance with the present invention. The optical outputs from the tapped delay lines can be directed into a device for compensating for the fixed delays provided by the tapped delay line. The outputs may also be directed into an array of optical phase-shifting elements, with each phase-shifting element operating on a separate output. These outputs can then be directed into a discrete set of beam-steering elements, such as an optical micro electro-mechanical system set of mirrors or a liquid crystal phased array. The combination of true-time delay and phase compensation provides that the beam leaving the array will emerge with a uniform phase front. This will allow the diffraction of the output beam to be dictated by the scale size of the entire aperture, rather than that of a sub-aperture or discrete element.

The benefit of such a beam steering system is that very short pulses can be steered into a set of given directions, with the initial short pulse-width maintained and its spatial output diffraction limited (at least at the transmitter aperture). By electronically partitioning the tapped optical delay line, a set of beams can be simultaneously directed into several different directions, so that an optical distribution network can be realized, with each link maintaining temporal and spatial coherence (i.e., true-time delay and spatial phasing). The basic system can enable high-bandwidth information to be distributed to a single location or to several different locations in space (simultaneously) from a common transmitter.

DETAILED DESCRIPTION OF PREFERRED EMBODIMENTS

Figure 1:
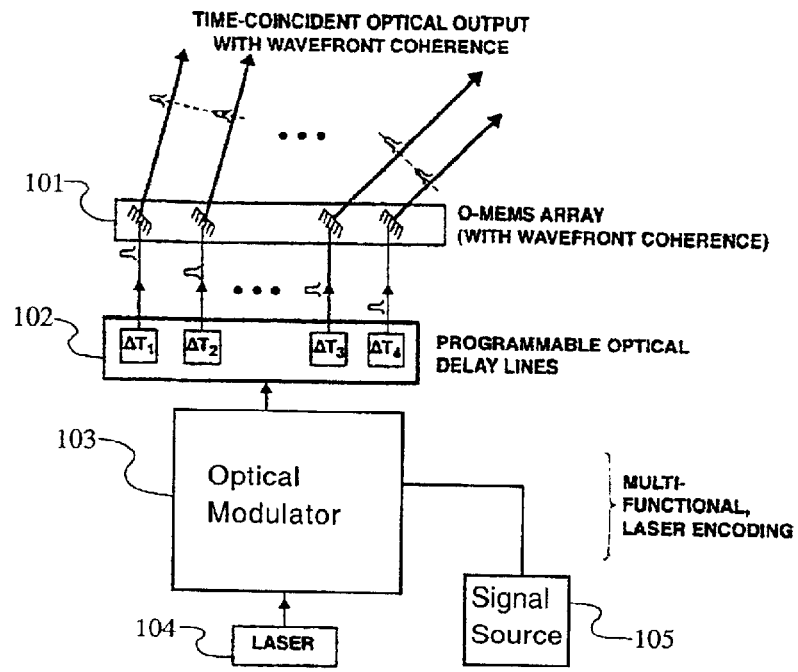
FIG. 1 (prior art) shows a block diagram of an optical true-time delay beam steering system

A block diagram of a prior art optical true-time delay (TTD) beam-steering system is shown in FIG. 1. The system is a modular composition of a beam steering subunit 101 based on optical MEMS arrays (typically having 100 to 1000 effective optical apertures in each dimension) and a controllable time-delay generation structure 102 comprising independent programmable optical delay paths for achieving the TTD correction for time coincidence. An optical modulator 103 supplies the signal for the programmable time-delay generation subunit 102 (with optional optical amplification). An information signal source 105 provides the information signal which is modulated onto the optical signal provided by a laser source 104. This system can accommodate a variety of signal modulation and encoding formats and, thus, is suitable for applications such as covert laser communications and laser radar (for target identification and ranging). A wavefront compensator may be integrated with the beam steering module to produce a spatially coherent wavefront.

The present invention comprises a novel time-delay generator, which greatly simplifies the basic optical beam steering system shown in FIG. 1. Recall that the system shown in FIG. 1 requires a set of independent programmable delay lines. Given the symmetry of the beam steering application, there is a simple relationship between the various delays—namely, that for a given desired angle to be scanned, the delays imparted by the programmable optical delay paths should result in each radiating element emitting its respective pulse at the same time as the other elements in the array. If the radiating elements are equally spaced, a single delay, Δt, is repeated between each of the elements of the beam steering array. The delay may be implemented by using a single serial optical input to a tapped delay line, with each tap generating the required equal element-to-element delays. The time delays, Δt, range from zero (for normal incidence optical beam) to a value on the order of the photon transit time between elements (about 3 psec for a 1 mm pitch). Thus, a single programmable tapped delay line is all that is necessary to service the entire array for a single scanned beam (parallel to a given line of the array).

Figure 2:
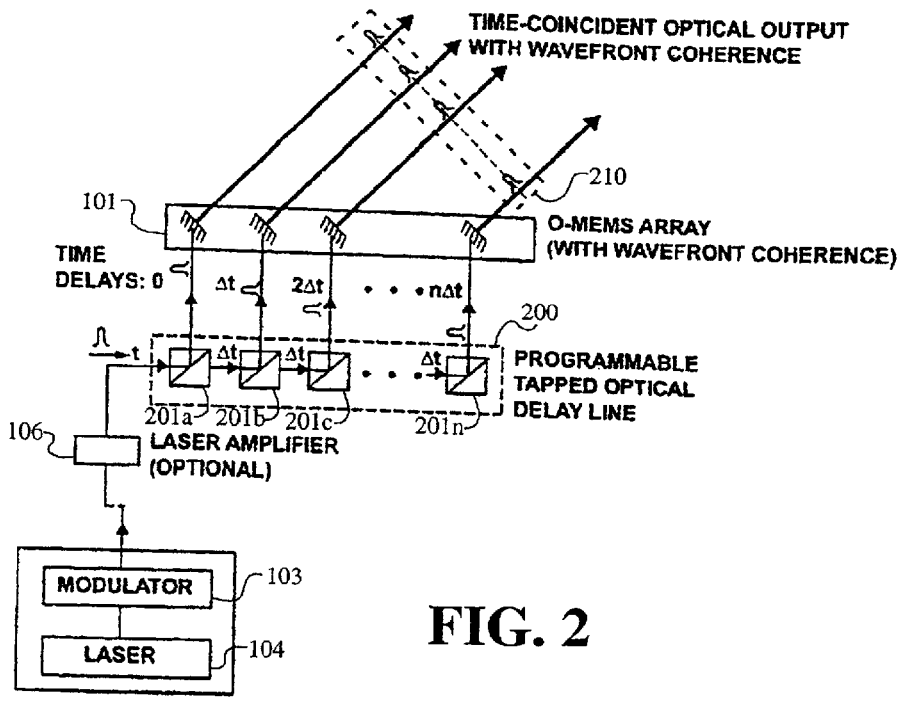
FIG. 2 shows a block diagram of an optical true-time delay beam steering system provided by the present invention.

FIG. 2 shows a block diagram of an optical beam steering system provided by the present invention. FIG. 2 shows the programmable time-delay generation subunit comprising a programmable tapped optical delay line 200 according to the present invention. The programmable tapped delay line may be configured to provide an equal amount of time delay, Δt, between each tap 201a, . . . , 201n, of the delay line. The time delays between the taps allow the optical array 101 to transmit an optical beam 210 with a time-coincident optical output.

As noted above, in optical beam steering, wavefront coherence is important to achieving a steered optical beam with minimum diffraction and side lobe structure of the beam. Even though the tapped delay line provides control over the time delay provided by each tap so that the optical beam may be steered, additional phase delay corrections may be required for each optical radiator to achieve a coherent optical wavefront. A wavefront coherence function may be integrated into the tapped delay line or the function may be provided by individual delays applied at each radiator. The purpose of a wavefront coherence function is to apply a specified optical phase shift individually to each of the optical pulse streams output from the tapped delay line. By applying the proper set of optical phase shifts, the optical pulses output by the radiating elements will produce a coherent wavefront that can be shaped to a desired shape. For example, if the phase shifts are applied so that all of the output pulse streams have the same optical phase front (to within modulo $2\pi$), the composite output beam-steered light will emerge simultaneously from the overall transmitter aperture (or, by reciprocity, received simultaneously at the receiver aperture). The effect is that the beam will emerge as a diffraction-limited beam with a uniform optical wavefront, as if it emerged from a perfectly flat large optical mirror. The control of the individual phase shifts can be realized by a variety of standard wavefront control techniques known in the art, such as a combination of a wavefront error sensor, feedback electronics, and servo-controllers that address individual optical phase shifters coupled to radiating elements in the array. The array may also be controlled to yield a spherical wavefront or any other overall wavefront, which can be optimized for the application and scenario of choice, such as a focussing application, beam spreading, sidelobe creation for multi-point beam steering, active nulling or clutter rejection, and other such applications known in the art.

Figure 3:
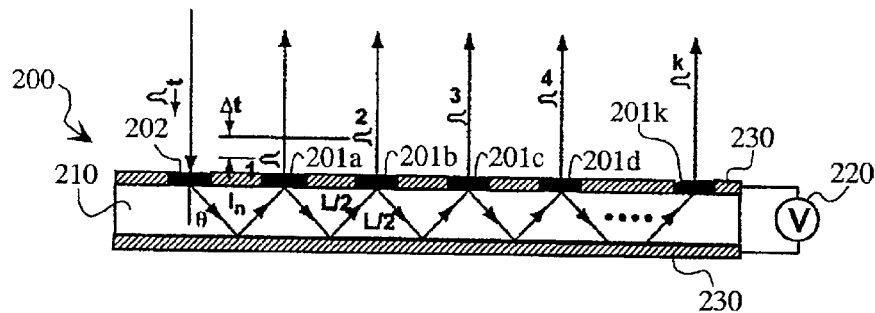
FIG. 3 illustrates an embodiment of the present invention comprising a bulk or optical substrate structure.

An embodiment of the programmable delay generator is shown in more detail in FIG. 3. In FIG. 3, a programmable, tapped delay line 200 using a bulk or optical substrate structure is shown. The waveguide structure comprises gratings 201a, . . . , 201k as tapped output couplers and an electro-optic guiding layer 210 for controllable time delay generation. Examples of possible electro-optic materials include COTS liquid crystals, polymers, or semiconductor thin films. A voltage source 220 connected to electrodes 230 on either side of the electro-optic layer 210 provides the ability to change the refractive index n within the electro-optic material. Simple transparent electrodes 230 deposited across both sides of the electro-optic guiding layer 210 allow all of the delays to be changed through the application of a single control voltage.

The refractive index n within the electro-optic guiding layer 210 is equal to the refractive index in the absence of the electro-optic effect $n_0$ and the change in refractive index $\Delta n$ provided by the electro-optic effect due to the voltage applied across the guiding layer 210 as shown below:

$$n = n_0 + \Delta n(V)$$

Light enters the delay line 200 through an input port 202. The light will be transmitted down the delay line 200 and will be coupled out at the tapped output couplers 201a, . . . , 201k. The width of the electro-optic guiding layer 210 is chosen to provide the maximum desired delay between output couplers 201a, . . . , 201k in the presence of the electro-optic effect. If the programmable tapped delay line 200 is used to support a beam steering application, the maximum delay should equal the transit time for a photon to propagate from one element of the beam steering array to the next element. If L is the transit distance within the guiding layer 210 from one output coupler to the next (where L/2 is the transit distance between a coupler and the opposite side of the guiding layer), the time delay is provided as shown below:

$$\Delta t = [\Delta n(v)]L/c + n_0 L/c$$

The output couplers 201a, ..., 201k comprise output gratings or other means to couple light out of the delay line. The output gratings may have increasing diffraction efficiency as they are disposed further down the delay line, so that the light coupled out at each coupler is at the same intensity. Light from the output couplers 201a, ... 201k may be coupled to a beam steering array using free-space techniques, such as direct radiation of the beam steering array or by using a prism followed by a set of lenses, or by using guided-wave structures, such as optical fibers or waveguides. If guided-wave structures are used, some form of path compensation may be required to ensure that there is a net zero differential time delay between the optical pulse streams output by the output couplers 201a, ..., 201k in the absence of an applied voltage from the voltage source 220. The path compensation may comprise a prism, or a set of optical fibers or waveguides of varying length.

A candidate electro-optic material for the electro-optic guiding layer 210 would be a liquid crystal layer, owing to its high tunable birefringence ($\Delta n \sim 0.3$ is currently available with low loss in visible and eyesafe wavelengths), and its rapid (msec) response. A single voltage applied across the electro-optic layer provides for a controllable set of delays along the entire line of tapped outputs. The time-delay values are deterministic, and can be stored in a COTS memory chip as a look-up table for rapid reconfigurability. A single true-time delay device in accordance with the present invention can provide the required time delays for scanning about one axis across an entire optical beam steering array. Given the birefringence of liquid crystals $\Delta n \approx .3$, the path length through a guiding layer composed of liquid crystal material is on the order of 1 millimeter. Transparent electrodes 230 are deposited across both sides of the electro-optic guiding layer 210 so that all the delays can be changed through the application of a single control voltage.

An optical beam steering system requires a controllable delay time between nearest neighboring beam steering apertures to range from zero (for normal incidence) to about the transit time it takes for a photon to propagate from one element to its neighbor (for maximum angular deflection). In the case of beam deflectors separated by 500 $\mu$m, the maximum time delay needed between elements is about 1.6 psec. For example, for a 10 cm total aperture, the transit time across the aperture is about 300 psec. Hence, beam deflectors that are coupled to optical pulse streams that are not time delayed to compensate for the transit time across the aperture are effectively limited to radiating a pulsed optical signal with a pulse frequency less than 1 GHz. Time delaying the optical pulses provides for radiating optical pulses with a pulse frequency on the order of 1 THz. The limiting factor when time delaying is used is that the time delaying device may disperse the pulse optical signals, since different optical frequencies traverse the device at different speeds. This temporal dispersion will depend upon the material used within the delay line. However, the dispersion may be reduced with dispersion compensation elements, such as an array of fibers with negative group velocity dispersion, which may allow for the radiation (or reception) of optical signals higher than 1 THz.

Rather than applying a single control voltage across the electro-optical layer at each tapped output port, a separate control voltage may be used at each tapped output port. This allows for individual control of the delay for each optical pulse stream output by the device. A device with individual control over the delays for each output port may be used with a beam steering array with arbitrarily spaced radiators. The device could then provide the requisite delays for precision beam steering and to provide some measure of the wavefront coherence function previously discussed.

Figure 4:
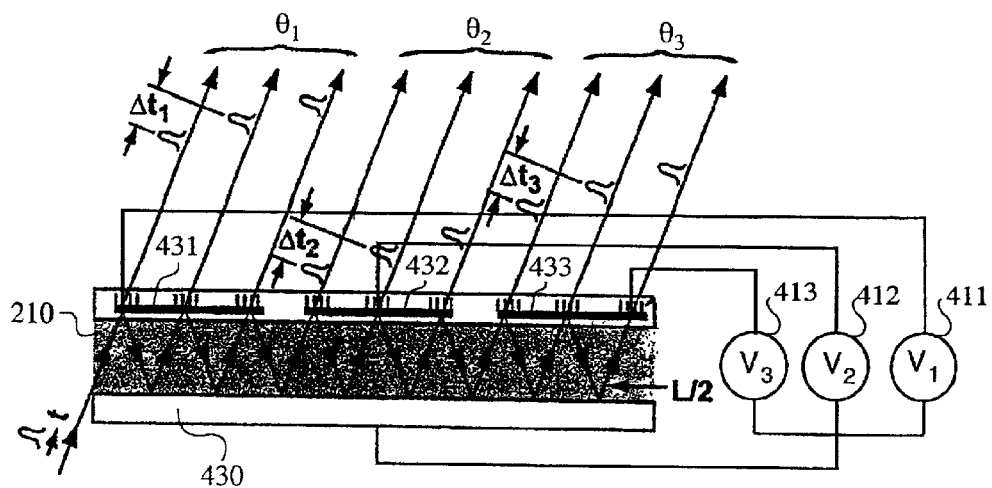
FIG. 4 illustrates an embodiment of the present invention providing individual time delay control over three sets of outputs.

An alternative embodiment of the tapped programmable delay generator provides a series of partitioned delay lines, with each delay line set to an independent set of electro-optic delays. FIG. 4 shows a schematic diagram of this embodiment of the present invention where three sets of electro-optic delays are provided. In FIG. 4, three voltage sources, 411, 412, 413, apply different voltages across three different regions of the tapped delay line. The upper electrode is partitioned into three regions 431, 432, 433 to allow the application of the three different voltages across the electro-optic guiding layer 210. The three voltage sources allow the control of optical beams at three separate angles $\theta_1$, $\theta_2$, $\theta_3$. Of course, all the voltages can be set to the same value if a single beam is to be scanned, i.e., all the delay taps will possess the same differential delay.

The three regions 431, 432, 433 of the upper electrode are electrically isolated from each other to allow for the application of different voltages. Fringing fields may be present at the electrodes which may limit the spacing of the electrodes or the density of tapped outputs. Alternatively, the control voltages applied to the electrodes may be controlled so as to compensate for the presence of fringing fields to allow for the proper time delay to be imparted on the optical pulse streams output by the device. The proper control voltages may be determined by initially calibrating the system and then storing the required control voltage values in a memory device.

Figure 5:
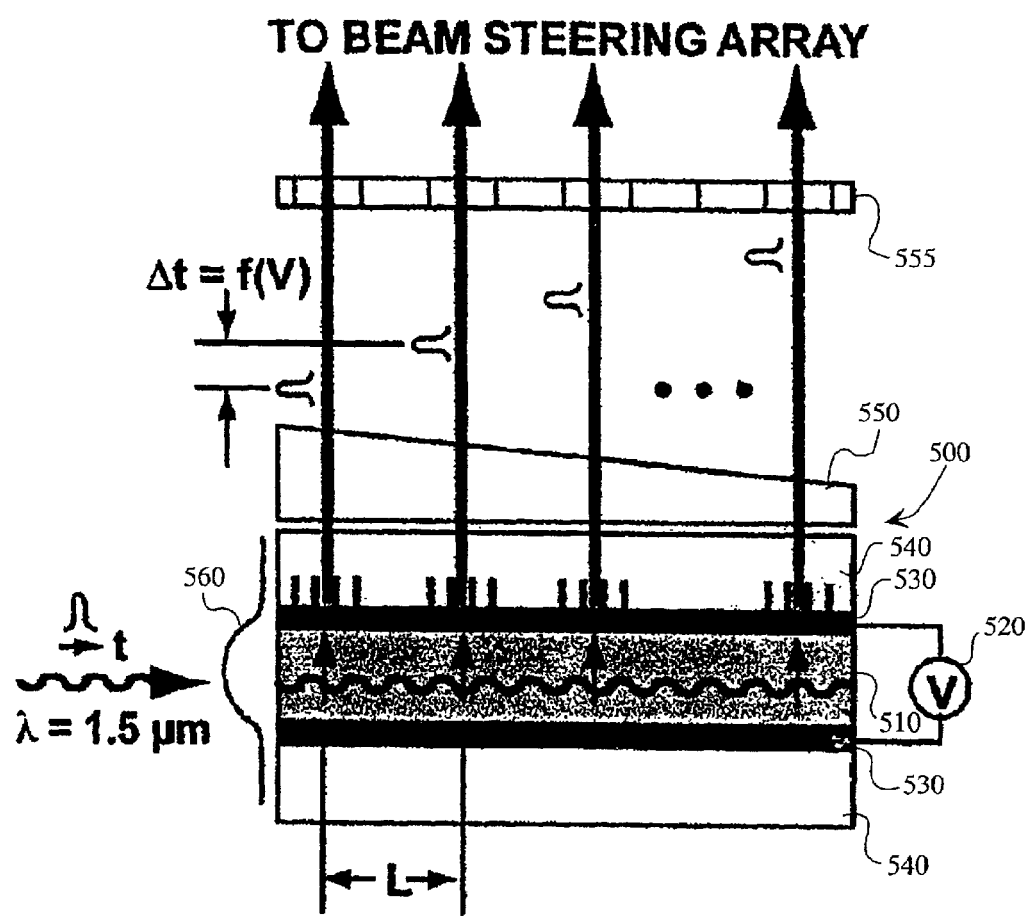
FIG. 5 illustrates an alternative embodiment of the present invention comprising a guided-wave structure combined with fixed time delay and phase compensation.

Another embodiment of the present invention is a tapped delay line structure using guided-wave architectures. Such an embodiment of the present invention is shown in FIG. 5. In FIG. 5, the tapped delay line 500 is a planar waveguide structure, comprising a guided-wave layer 510; transparent electrodes 530; and gratings 501a, ... 501k, contained within a cladding substrate 540. Unlike the zigzag structure previously discussed, in which a thick electro-optic layer is required to realize the necessary physical length necessary for the controllable time delays, the integrated optic device provides a propagation length equal to the distance between beam steering apertures. Therefore, the thickness of the guided-wave layer 510 can be very thin, in the 5 to 10 $\mu$m range, which is typical for conventional liquid crystal devices. The thin structure provides for electro-optic response times of milliseconds, which is suitable for optical beam steering.

The guided-wave layer 510 is configured so that the incident optical beam propagates along the medium in a lateral direction, thereby experiencing the time delay provided by the electro-optic effect along its entire path. The structure may be made very thin, since the beam is essentially moving in the plane of the structure, rather than bouncing from one boundary layer of the medium to the other. By having a very thin structure, the voltage required for inducing the required delay change is reduced because the electric field generated by a given voltage applied to electrodes increases as the electrodes are spaced more closely.

Referring again to FIG. 5, the electro-optic layer 510, with a large tunable birefringence, provides the guiding layer for the delay structure 500 as well as the temporal delay. Holographic or etched gratings 501a, . . . , 501k positioned along the surface of the structure serve as the tapped-delay output ports. The temporal delays are controlled via a single applied voltage from a voltage source 520 applied to transparent electrodes 530 positioned on either side of the electro-optic layer 510. The applied voltage provides an electric field across the electro-optic layer 510 providing control over the refractive index within the layer.

For beam steering applications, a thin prism 550 may serve as a fixed path-length compensator element to assure temporal coincidence for normal coincidence. Additionally, an electro-optic array 555 may be disposed to receive the optical beams output from the guided-wave delay line structure 500 to provide wavefront phasing for spatial coherence of the optical beams.

Since response times of milliseconds are required for this true-time delay structure, a variety of electro-optical materials are available, which have large tunable birefringence in the wavelength regions of interest. Examples of electro-optic material for this embodiment of the present invention include liquid crystals, polymers, polymer dispersed liquid crystals (PDLCs), and semiconductor-based structures, including quantum well waveguides and heterostructures.

In the case of a single beam to be scanned by the system, only a single voltage is needed to generate all the necessary delays for a given angle. In the case of multiple-beam scanning (i.e., N beams, with each beam scanned to a different angle), one control voltage setting may be used for each beam, which can be realized by providing voltage control over different regions of the delay line, as discussed previously.

Figure 6:
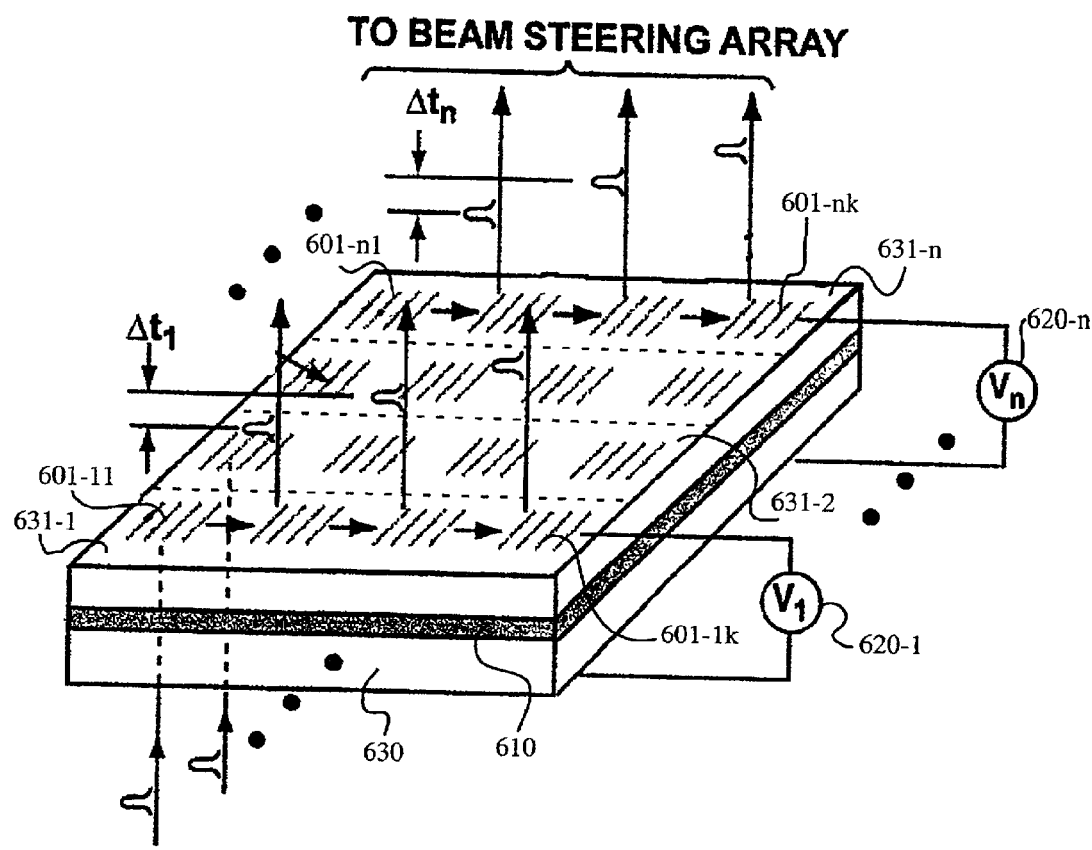
FIG. 6 illustrates an embodiment of the present invention for two dimensional beam steering.

Yet another embodiment of the present invention provides two-dimensional deployment of the basic tapped delay line so that a compact geometry can be realized. This embodiment supports large arrays of beam steering elements. A two-dimensional system can be fabricated using a step-and-repeat process, such that a true-time delay structure serves as a unit cell in the larger array. A two-dimensional guided-wave delay structure 600 in accordance with the present invention is shown in FIG. 6. A larger structure, used to support large beam steering arrays, consists of an array of two-dimensional guided-wave delay structures 600.

An optical coupling element, such as a prism or a device producing an optical grating pattern, channels an incident optical beam into the proper guided-wave region of the two-dimensional structure 600. The two dimensional structure 600 is fabricated so as to guide and confine the incident optical pulses within the structure 600 in the proper directions, both laterally and transversely. The incident optical pulses may be coupled into the structure 600 at one end of the structure 600, or "end-firing" the optical pulses into the wave-guide structure 600, as is known in the art. Alternatively, the incident optical pulses may be coupled into either the top surface or bottom surface of the structure 600. Coupling of the light at the top surface or the bottom surface may be accomplished by prisms attached to the either surface, by coupling the incident light pulses at input optical gratings present on either surface, or by using other means known in the art for transversely coupling light into a light waveguide structure.

In FIG. 6, an electro-optic wave-guiding layer 610 is disposed between a lower common electrode 630 and an upper electrode partitioned into electrode regions 631-1, . . . , 631-n. Voltage sources 620-1, . . . , 620-n connected to the electrode regions 631-1, . . . , 631-n provide individual control over the index of refraction in the electro-optic layer 610. Several lines of output gratings 601-11, . . . , 601-nk are positioned on top of the electro-optic layer 610, such that a grid of output gratings 601-11, . . . , 601-nk is provided. Each line of output gratings 601-11, . . . , 601-nk is contained in a separate electrode region 631-1, . . . , 631-n. For example, as shown in FIG. 6, the first line of output gratings depicted as 601-11, . . . , 601-1k is contained within the electrode region depicted as 631-1. FIG. 6 depicts n lines of output gratings and, correspondingly, n electrode regions and n voltage sources. In FIG. 6, each line of output gratings contains k output gratings. The output gratings 601-11, . . . , 601-nk in each line of output gratings 601-11, . . . , 601-nk may be configured such that the diffraction efficiency of the gratings 601-11, . . . , 601-nk increases from one end of the line of gratings to the other. The stream of incident optical pulses is split into several streams and each stream is coupled to a region of the electro-optic wave-guiding layer 610 associated with a line of output gratings.

In FIG. 6, note that the input beam from the modulated source is incident to the TTD structure from the bottom surface of the substrate, whereas the ensemble of time-delayed output beams emerge from the top surface, which are subsequently directed to the beam steering module. As discussed above, prisms, gratings, or other means known in the art may provide for coupling the input beam into the bottom surface, thus avoiding the additional space required to couple light into the structure from the side. This TTD modular configuration is amenable to a stacked three-dimensional optical interconnection architecture for the entire system.

Given the deterministic dependence of the time delay as a function of angle, the set of required time delays (i.e., EO voltage levels) can be stored in an onboard memory chip (e.g., an e-prom), so that a look-up table can be incorporated into the module. Thus, for a given scan angle, a single control voltage value can be generated for the required time delay taps. Fixed optical gratings in the structure enable coupling of the modulated optical beam into the TTD module, as well as out-coupling of the delayed beams from the tapped ports to the beam steering module. There is also the potential of integrating optical amplifier stages within the module (e.g., EFDAs or doped planar cladding layers) to realize greater optical output powers.

From the foregoing description, it will be apparent that the present invention has a number of advantages, some of which have been described above, and others of which are inherent in the embodiments of the invention described above. Also, it will be understood that modifications can be made to the method and apparatus of optical true-time described above without departing from the teachings of subject matter described herein. As such, the invention is not to be limited to the described embodiments except as required by the appended claims.

What is claimed is:

1. An optical system comprising:
   an optical pulse source generating an input optical pulse stream;
   a controllable optical delay structure coupled to the optical pulse source, the optical delay structure providing a plurality of output optical pulse streams, each output optical pulse stream having a controllable time delay relative to the input optical pulse stream;
   a control means for controlling the controllable time delay of each output optical pulse stream;
   an array of optical apertures, each optical aperture in the array receiving one output optical pulse stream from the plurality of output optical pulse streams; and a wavefront compensator integrated with the array of optical apertures.

2. The optical system according to claim 1, wherein the array of optical apertures comprises an array of steerable optical apertures.

3. The optical system according to claim 1, wherein the optical pulse source comprises:
an optical pulse generator generating a stream of unmodulated optical pulses;
an information signal source; and
an optical modulator modulating the unmodulated optical pulses with an information signal from the information signal source to produce the input optical pulse stream.

4. The optical system according to claim 3, wherein the optical pulse generator comprises a laser.

5. The optical system according to claim 1 wherein the controllable time delay of at least one output optical pulse stream is controllable over a continuous range of optical delays.

6. An optical system comprising:
an optical pulse source generating an input optical pulse stream;
a controllable optical delay structure coupled to the optical pulse source, the optical delay structure providing a plurality of output optical pulse streams, each output optical pulse stream having a controllable time delay relative to the input optical pulse stream; and
a control means for controlling the controllable time delay of each output optical pulse stream,
wherein the controllable optical delay structure comprises:
a layer of electro-optically active material having a proximal end and a distal end;
means for applying voltage across the layer of electro-optically active material;
means for coupling the input optical pulse stream into the proximal end of the layer of electro-optic material; and
a plurality of tapped output couplers, said tapped output couplers disposed in a linear direction from the proximal end to the distal end of the layer of electro-optically active material, each tapped output coupler of the plurality of tapped output couplers disposed in an increasing distance from the proximal end to the distal end of the electro-optically active material,
wherein the control means controls the means for applying voltage.

7. The optical system according to claim 6, wherein the layer of electro-optically active material comprises an optical bulk substrate structure having a specified thickness, the bulk substrate structure having an upper internally reflective surface and a lower internally reflective surface, wherein the input optical pulse stream propagates from the proximal end to the distal end by successively reflecting from one internally reflective surface to the other, and the controllable time delay being proportional to the specified thickness and the distance between each tapped output coupler.

8. The optical system according to claim 6, wherein the layer of electro-optically active material comprises a guided-wave electro-optic device having an upper surface and a lower surface generally parallel to each other, wherein the input optical pulse stream propagates from the proximal end to the distal end by moving in a direction generally parallel to the surfaces, and the controllable time delay being proportional to the distance between each tapped output coupler.

9. The optical system according to claim 6 wherein the means for applying voltage comprises:
a first electrode located on a first side of the layer of electro-optic material;
a second electrode located on a second side of the layer of electro-optic material opposite the first side,
and wherein the control means comprises a voltage source connected to the first electrode and to the second electrode.

10. The optical system according to claim 6 wherein the means for applying voltage comprises:
a first plurality of electrodes located on a first side of the layer of electro-optic material;
a second plurality of electrodes located on a second side of the layer of electro-optic material opposite the first side, each electrode in the second plurality of electrodes paired with a corresponding electrode in the first plurality of electrodes to form an electrode pair,
and wherein the control means comprises a plurality of separately controllable voltage sources, each voltage source in the plurality of voltage sources connected to one or more electrode pairs.

11. The optical system according to claim 6 wherein each tapped output coupler in said plurality of tapped output couplers is located equidistant from adjoining tapped output couplers.

12. The optical system according to claim 6 wherein said plurality of tapped output couplers comprises a plurality of output gratings.

13. The optical system according to claim 6 wherein each tapped output coupler in said plurality of tapped output couplers has a diffraction efficiency, said diffraction efficiency increasing with the distance that each tapped output coupler is disposed from said proximal end.

14. An optical system comprising:
an optical pulse source generating an input optical pulse stream;
a controllable optical delay structure coupled to the optical pulse source, the optical delay structure providing a plurality of output optical pulse streams, each output optical pulse stream having a controllable time delay relative to the input optical pulse stream;
a control means for controlling the controllable time delay of each output optical pulse stream,
wherein the controllable optical delay structure comprises:
a layer of electro-optically active material having a proximal edge, a distal edge, a leading edge, and a trailing edge, wherein a first line having the proximal edge and the distal edge as its ends is perpendicular to a second line having the leading edge and the trailing edge as its ends;
means for applying voltage across the layer of electro-optic material;
means for coupling the input optical pulse stream into the proximal edge of the layer of electro-optically active material; and
a plurality of lines of tapped output couplers, the tapped output couplers in each line disposed in a linear direction from the proximal edge to the distal edge of the layer, each tapped coupler in each line of tapped couplers disposed in an increasing distance from the proximal edge to the distal edge, and each line of tapped output couplers disposed in a linear direction from, the leading edge to the trailing edge of the layer, wherein the control means controls the means for applying voltage.

15. The optical system according to claim 14, wherein the layer of electro-optically active material comprises an optical bulk substrate structure having a specified thickness, the bulk substrate structure having an upper internally reflective surface and a lower internally reflective surface, wherein the input optical pulse stream is split into a plurality of parallel input optical pulse streams, each parallel input optical pulse stream moving from the proximal edge to the distal edge of the layer in a line defined by a separate one of the plurality of lines of tapped output couplers by successively reflecting between internally reflective surfaces, and the controllable time delay being proportional to the specified thickness and the distance between each tapped output coupler.

16. The optical system according to claim 14, wherein the layer of electro-optically active material comprises a guided-wave electro-optic device having an upper surface and a lower surface generally parallel to each other, wherein the input optical pulse stream is split into a plurality of parallel input optical pulse streams, each parallel input optical pulse stream moving from the proximal edge to the distal edge of the layer by moving in a direction defined by a separate one of the plurality of lines of tapped output couplers and generally parallel to the surfaces, and the controllable time delay being proportional to the distance between each tapped output coupler in the separate line of tapped output couplers.

17. The optical system according to claim 14 wherein the means for applying voltage comprises:

a plurality of lines of electrodes located on a first side of the layer of electro-optically active material; and a common electrode located on a second side of the layer of electro-optically active material opposite the first side, wherein said plurality of lines of electrodes are disposed generally parallel and adjacent to the lines of tapped output couplers and wherein the control means comprises voltage sources connected between each line of electrodes in the plurality of lines of electrodes and the common electrode.

18. The optical system according to claim 14 wherein the means for applying voltage comprises:

a matrix of individually addressable electrodes located on a first side of the layer of electro-optically active material, the electrodes separated from one another in two perpendicular directions; and a common electrode located on a second side of the layer of electro-optic material opposite the first side, wherein the control means comprises voltage sources connected between each individually addressable electrode in the matrix of individually addressable electrodes and the common electrode.

19. The optical system according to claim 14 wherein each tapped output coupler in each line of tapped output couplers is located equidistant from adjoining tapped output couplers and each line of tapped output couplers is located equidistant from adjoining lines of tapped output couplers.

20. The optical system according to claim 14 wherein each tapped output coupler comprises an output grating.

21. The optical system according to claim 14 wherein each tapped output coupler has a diffraction efficiency, said diffraction efficiency increasing with the distance that each tapped output coupler is disposed from said proximal end.

22. A method for generating multiple optical pulse streams with controllable time delays comprising the steps of:

providing an optical pulse stream;

coupling the optical pulse stream into a controllable optical delay structure, the optical delay structure providing a plurality of delayed optical pulse streams, each delayed optical pulse stream having a controllable time delay relative to the input optical pulse stream; and controlling the delay of each delayed optical pulse stream, wherein the step of coupling the optical pulse stream into a controllable optical delay structure comprises:

coupling the optical pulse stream into a layer of electro-optically active material, the layer of electro-optically active material having multiple output ports disposed in a longitudinal direction;

directing said optical pulse stream in a longitudinal direction in the layer; and coupling a portion of the optical pulse stream out of the layer at each output port to create the delayed optical pulse stream transmitted at each optical port, and the step of controlling the delay of each output optical pulse stream comprises the steps of:

applying voltage across said layer of electro-optically active material; and controlling the voltage to control an amount of delay provided to each delayed optical pulse stream.

23. The method according to claim 22, wherein the layer of electro-optically active material comprises an optical bulk substrate structure having a specified thickness, the bulk substrate structure having an upper internally reflective surface and a lower internally reflective surface wherein the optical pulse stream propagates in the longitudinal direction of the layer by successively reflecting between the internally reflective surfaces.

24. The method according to claim 22, wherein the layer of electro-optically active material comprises a guided-wave electro-optic device having an upper surface and a lower surface generally parallel to each other, wherein the optical pulse stream propagates in the longitudinal direction of the layer in a direction generally parallel to the surfaces.

25. The method according to claim 22 wherein said each output port of said multiple output ports is located equidistantly from adjoining output ports.

26. A method for generating multiple optical pulse streams with controllable time delays comprising the steps of:

providing an optical pulse stream;

coupling the optical pulse stream into a controllable optical delay structure, the optical delay structure providing a plurality of delayed optical pulse streams, each delayed optical pulse stream having a controllable time delay relative to the input optical pulse stream; and controlling the delay of each delayed optical pulse stream, wherein the step of coupling the optical pulse stream into a controllable optical delay structure comprises:

splitting the optical pulse stream into a plurality of parallel optical pulse streams;

coupling the optical pulse stream into a layer of electro-optically active material, the layer of electro-optically active material having a plurality of lines of output ports disposed laterally and parallel to each other across the layer and each line of output ports having multiple output ports disposed in a longitudinal direction across the layer;

directing the parallel optical pulse streams into the layer of electro-optically active material, each parallel optical pulse stream directed towards a corresponding line of output ports; and coupling a portion of each parallel optical pulse stream out of the layer at each output port in the corresponding line of output ports to create the delayed optical pulse stream transmitted at each optical port, and the step of controlling the delay of each delayed optical pulse stream comprises the steps of:

applying a plurality of voltages across said layer of electro-optically active material, each voltage corresponding to a line of output ports and applied in the vicinity of the corresponding line of output ports; and controlling each voltage to control an amount of delay provided to each delayed optical pulse stream.

27. The method according to claim 26, wherein the layer of electro-optically active material comprises a optical bulk substrate structure having a specified thickness, the bulk substrate structure having an upper internally reflective surface and a lower internally reflective surface, wherein the optical pulse stream propagates in the longitudinal direction of the layer by successively reflecting between the internally reflective surfaces.

28. The method according to claim 26, wherein the layer of electro-optically active material comprises a guided-wave electro-optic layer having an upper surface and a lower surface generally parallel to each other, wherein the optical pulse stream propagates in the longitudinal direction of the layer in a direction generally parallel to the surfaces.

29. An optical beam steering device comprising:

at least one layer of electro-optically active material, the at least one layer of electro optically active material having a proximal end and a distal end;

means for applying a voltage across the at least one layer;

means for coupling an optical signal into the proximal end of the at least one layer;

a plurality of tapped output couplers providing optical beam outputs, the tapped output couplers disposed on the at least one layer in a linear direction from said proximal end to said distal end, each tapped output coupler of the plurality of tapped output couplers disposed in an increasing distance from the proximal end;

an array of optical apertures, each optical aperture in the array of optical apertures receiving an optical beam output from a corresponding one tapped output coupler of the plurality of tapped output couplers.

30. The optical beam steering device of claim 29, wherein the means for applying a voltage across the at least one layer comprises:

a first electrode located on a first side of the at least one layer;

a second electrode located on a second side of the at least one layer opposite the first side; and a controllable voltage source connected to the first electrode and the second electrode, the voltage source generating a controllable electric field between the first electrode and the second electrode when the voltage source is controlled to generate a voltage.

31. The optical beam steering device of claim 29, wherein the means for applying a voltage across the at least one layer comprises:

a plurality of first electrode regions located on a first side of the at least one layer;

a plurality of second electrode regions located on a second side of the at least one layer opposite the first side; and a plurality of controllable voltage sources, each voltage source connected to a corresponding one first electrode region of the plurality of first electrode regions and to a corresponding one second electrode region of the plurality of second electrode regions, each voltage source generating a controllable electric field between the corresponding first electrode region and the corresponding second electrode region when the corresponding voltage source is controlled to generate a voltage.

32. The optical beam steering device of claim 29, wherein the means for coupling an optical signal into the proximal end of the at least one layer comprises an input optical grating disposed at the proximal end of the at least one layer.

33. The optical beam steering device of claim 29, wherein the means for coupling an optical signal into the proximal end of the at least one layer comprises an optical prism disposed at the proximal end of the at least one layer.

34. The optical beam steering device of claim 29, further comprising means for compensating for fixed delays, said means disposed between the tapped output couplers and the array of optical apertures, said means applying a fixed delay to each optical beam output, said fixed delay inversely proportional to the distance from each tapped output coupler to the proximal end.

35. The optical beam steering device of claim 34, wherein said means for compensating comprises an optical prism.

36. The optical beam steering device of claim 29, wherein tapped output couplers are disposed in several lines of couplers on the at least one layer of electro-optically active material, each line of couplers comprising a plurality of tapped output couplers in a linear direction from the proximal end to the distal end, and the lines of couplers disposed parallel to each other on the at least one layer, and wherein the means for coupling an optical signal into the proximal end of the at least one layer couples the optical signal into each line of couplers.

37. The optical beam steering device of claim 29, wherein the at least one layer of electro optically active material comprises at least one layer of liquid crystal material.

38. A method of optical beam steering comprising the steps of:

coupling an input optical beam into at least one layer of electro-optically active material, the at least one layer having a plurality of optical output ports disposed in a longitudinal direction on one side of the at least one layer, each optical output port of the plurality of optical output ports being disposed in an increasing distance from a proximal end of the at least one layer to a distil end of the at least one layer;

directing the input optical beam into the at least one layer in the longitudinal direction of the plurality of optical output ports;

coupling a portion of the input optical beam out of the at least one layer at each output port to transmit a delayed optical beam from each output port, the delayed optical beam from each output port having a controllable delay in relation to the input optical beam;

applying an electric field across the at least one layer;

controlling the electric field to control the delay in the delayed optical beam from each output port; and directing the delayed optical beam from each output port to an optical beam steering array.

39. The method of optical beam steering according to claim 38, wherein the step of applying an electrical field comprises:

providing a first electrode on a first side of the at least one layer;

providing a second electrode on a second side of the at least one layer, the second side being opposite the first side; and connecting a voltage source to the first electrode and the second electrode, and wherein the step of controlling the electric field comprises controlling the voltage source.

40. The method of optical beam steering according to claim 38, wherein the step of applying an electrical field comprises:

providing a plurality of first electrodes on a first side of the at least one layer;

providing a plurality of second electrodes on a second side of the at least one layer, the second side being opposite the first side; and connecting a plurality of voltage sources to the plurality of first electrodes and second electrodes, each voltage source connected to a corresponding one first electrode of the plurality of first electrodes and a corresponding one second electrode of the plurality of second electrodes, wherein the step of controlling the electric field comprises separately controlling the voltage sources.

41. The method of optical beam steering according to claim 38, wherein the step of directing each delayed optical beam to an optical beam steering array comprises:

applying a separate fixed delay to the delayed optical beam from each output port, the fixed delay inversely proportional to the distance from the output port to the proximal end of the at least one layer; and directing the delayed optical beam with the separate fixed delay from each output port to the optical beam steering array.

* * * * *